July 12, 1949.   HENRI-GEORGES DOLL   2,476,136
METHOD AND APPARATUS FOR LOCATING PREDETERMINED
LEVELS IN BORE HOLES
Filed April 19, 1940   2 Sheets-Sheet 2
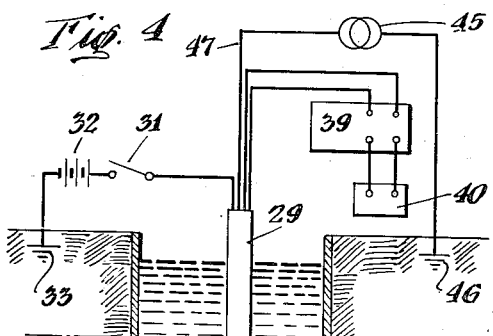
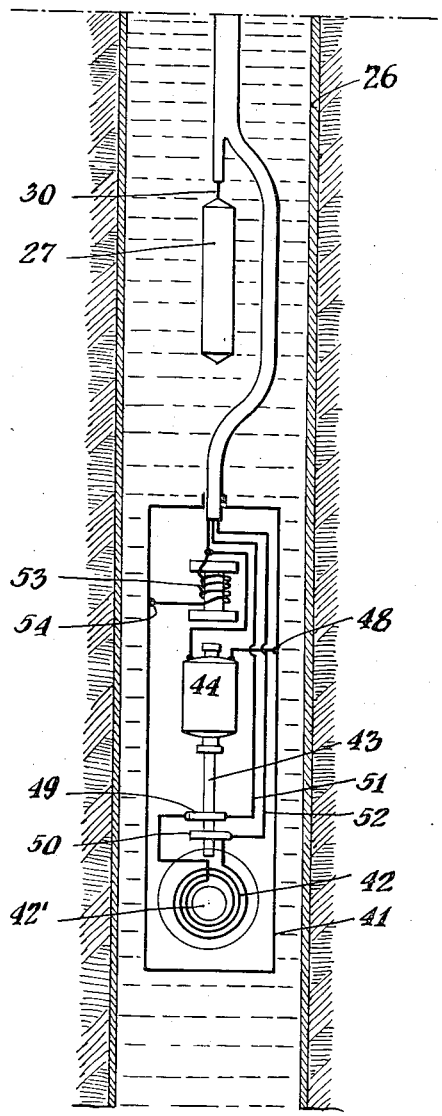
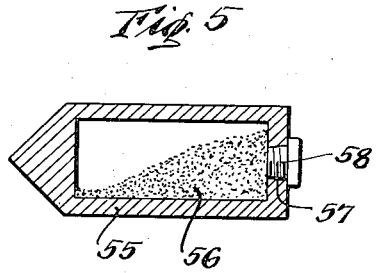
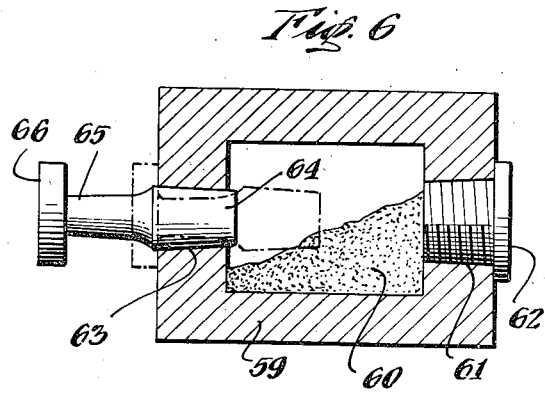
INVENTOR
Henri Georges Doll
BY
Hoguet, Meary & Campbell
ATTORNEYS Patented July 12, 1949

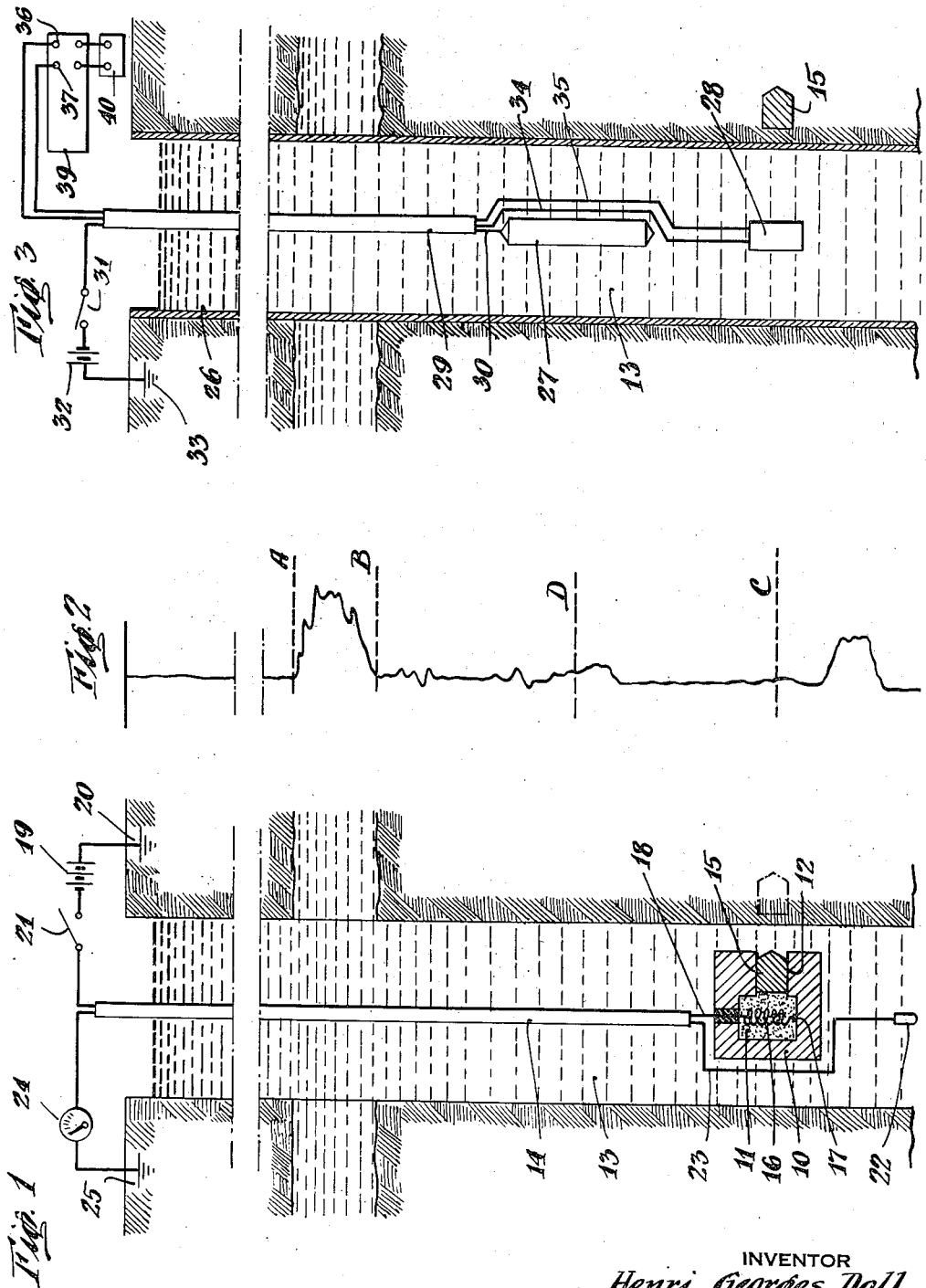

2,476,136

UNITED STATES PATENT OFFICE 2,476,136

METHOD AND APPARATUS FOR LOCATING PREDETERMINED LEVELS IN BOREHOLES

Henri-Georges Doll, Paris, France, assignor, by mesne assignments, to Schlumberger Well Surveying Corporation, Houston, Tex., a corporation of Delaware Application April 19, 1940, Serial No. 330,545
In France April 27, 1939

23 Claims. (Cl. 166—1)

The present invention relates to methods and apparatus for locating a predetermined level or levels in a bore hole. More specifically it relates to a novel method and means for accurately positioning apparatus at a given level in a bore hole in a simple and highly effective manner.

In the boring and exploitation of petroleum bore holes, it is frequently the practice to investigate the strata surrounding a bore hole after or during the drilling thereof for the purpose of determining the location of those strata which contain petroleum. Investigations of this character may be carried out in any known manner as, for example, by taking samples or cores from the wall of the bore hole or by using the so-called "electrical coring" methods.

When this study has been completed, the bore hole is fitted with a metallic casing, the lower end of which is usually closed by a cement plug, and the casing is eventually perforated in the vicinity of a petroleum bearing stratum or strata to permit the oil to be obtained therefrom.

Some difficulty has been experienced in the past in locating accurately the predetermined levels of the petroleum bearing strata after the casing has been fitted in the bore hole. It has been found that errors are introduced, particularly at great depths, by the elastic elongation of the cables ordinarily used in making depth measurements. For this reason, it is difficult to position apparatus accurately at any predetermined level in a bore hole.

It is an object of the invention, accordingly, to provide a novel method and apparatus for locating a predetermined level or levels in a bore hole accurately and in a simple and highly effective manner.

Another object of the invention is to provide a method and apparatus of the above character for acurately locating, in a cased bore hole, a level or levels determined prior to the insertion of the casing therein.

A further object of the invention is to provide a new and improved method and apparatus for accurately and effectively positioning apparatus at any given level in a bore hole.

In accordance with the invention, each predetermined stratum which is of interest is identified prior to the fitting of the casing in the bore hole by marking means which is of such character that its presence may be detected after the casing has been set. The marking means is located at a known position in the bore hole with respect to the stratum which it identifies. For example, it may be located at the level of the stratum or at a known distance above or below it.

After the bore hole has been cased, the level of any particular stratum of interest traversed thereby may be located by moving apparatus for detecting the marking means through the bore hole until the marking means corresponding to the stratum in question has been located. Since the location of the marking means with respect to the particular stratum it identifies is known, the exact level of the stratum may be readily determined with good accuracy.

In similar fashion, apparatus such as a gun casing perforator, for example, may be accurately positioned at the level corresponding to any given stratum by lowering it into the bore hole along with the apparatus for detecting the marking means until the marking means corresponding to the given stratum is located. Inasmuch as the spatial relationships between the gun perforator and detecting means and the stratum and its marking means are known, the perforator may be readily moved to a level closely approximating the exact level of the desired stratum.

In one embodiment of the invention, the marking means comprises a magnetized body which may be projected from a gun, for example, into the wall of the bore hole at a known level with respect to a given stratum. An magnetized body of this character provides a magnetic field which may be readily detected through the metallic casing by any apparatus for providing indications of a magnetic field, such as an induction compass, for example.

In another embodiment, the marking means is constituted by a radioactive material, which is used to identfy the various strata of interest. Such materials give off radioactive radiations, such as gamma rays, for example, which may be readily detected through a metallic casing.

A further embodiment utilizes as the marking means a substance capable of generating heat slowly over a long period of time. When a marking means of this character is embedded in the wall of a bore hole, the heat generated thereby produces an appreciable rise in temperature in the stratum and the adjacent portion of the metallic casing at the level thereof, which may be readily detected by any suitable temperature indicating means.

The invention may be better understood from the following detailed description of several preferred embodiments, taken in connection with the accompanying drawings, in which:

Fig. 1 is a schematic diagram illustrating apparatus for identifying strata of interest in an uncased bore hole by marking means according to the invention;

Fig. 2 is a curve of spontaneous potentials obtained in the bore hole shown in Fig. 1;

Fig. 3 is a schematic diagram of apparatus for positioning a body at any predetermined level in the bore hole after a casing has been inserted therein;

Fig. 4 illustrates schematically apparatus for detecting magnetic marking means through the casing in the bore hole;

Fig. 5 illustrates a modified form of marking means which is designed to give off radioactive emissions in a bore hole; and Fig. 6 is a schematic diagram of a marking means which is adapted to generate heat in the bore hole.

In general, investigations will have been made previously in the bore hole for the purpose of determining the levels of the petroleum bearing strata. These levels may have been ascertained, for example, by obtaining indications of the apparent resistivity of the formations traversed by the bore hole according to the method described in the prior Patent No. 1,819,923 to Conrad Schlumberger. Additional information also may have been obtained by investigating the spontaneous potential differences existing in the bore hole at different depths therein, as disclosed in the prior Patent No. 1,913,293 to Conrad Schlumberger.

In general, both the resistivity and spontaneous potential indications will be available in the form of curves plotted against depth in the bore hole. In addition to these curves, samples may have been taken from the wall of the bore hole by means of the apparatus described in the prior Patent No. 2,055,506 to Marcel Schlumberger, for example.

It will be assumed for the sake of simplicity that from one or more of the methods described above it has been determined that a petroleum bearing stratum exists at a certain known level in the bore hole. This stratum is indicated on the spontaneous potential diagram shown in Fig. 2 as extending between the depths A and B.

In accordance with the invention, the stratum A—B is first identified by marking means which is of such character that it may be detected after the casing has been inserted in the bore hole. The marking means may be located in its proper position by means of the apparatus illustrated in Fig. 1.

Referring to Fig. 1, the apparatus for locating the marking means in the bore hole comprises a gun 10 provided with a powder chamber 11 and a barrel portion 12, which extends laterally of the bore hole 13. The gun 10 is suspended in the bore hole 13 upon a cable 14 by means of which it may be raised or lowered therein. Within the barrel 12 of the gun 10 is disposed a marking means 15 which is constituted by a projectile adapted to be fired from the gun 10 into the wall of the bore hole 13.

The marking means 15 may be a magnetized body, or it may be a body containing a radioactive material or a material designed to generate heat slowly over a long period of time, as described in detail hereinafter.

The explosive charge in the powder chamber 11 may be ignited in any conventional manner, as for example, by passing current through a filament 16, one end of which is grounded at 17 to the mass of the gun 10 and the other end of which is connected to one of the conductors 18 in the cable 14. The conductor 18 is connected to one terminal of a source of current 19, which is located at the surface of the earth, the other terminal of which is grounded at the point 20. A switch 21 is provided in series with the source 19 which serves to close the ignition circuit when it is desired to fire the marking means 15 from the gun 10.

Suspended in the bore hole 13 a short distance beneath the gun 10 is an electrode 22, which is connected to a conductor 23 in the cable 14. The conductor 23 is connected to one terminal of a potential indicating instrument 24 located at the surface of the earth, the other terminal of which is grounded at the point 25.

The distance between the electrode 22 and the gun 10 should be about a meter or more, so that the metallic mass of the gun 10 will not alter the distribution of the spontaneous potential differences existing in the bore hole 13 at the level of the electrode 22. The potential indicating instrument 24 is preferably of the recording type and it provides indications of the spontaneous potentials existing in the bore hole in the form of a curve plotted against depth in the bore hole.

When it is desired to identify the petroleum bearing stratum A—B prior to the insertion of a casing into the bore hole 13, the locating apparatus is lowered into the bore hole until a comparison of the curve provided by the indicating instrument 24 with the curve shown in Fig. 2 indicates that the electrode 22 is a short distance below the stratum A—B. The locating apparatus is then raised in the bore hole and the curve of spontaneous potentials obtained from the potential indicating instrument 24 is continually compared with the previously obtained spontaneous potential curve illustrated in Fig. 2.

In this fashion, it is possible to acertain the exact position of the electrode 22 with respect to the spontaneous potential curve shown in Fig. 2, and since the distance between the electrode 22 and the gun 10 is known, the position of the gun 10 with respect to the spontaneous potential curve shown in Fig. 2 may be readily ascertained quite accurately.

The gun 10 is raised until it is close to the level of the stratum A—B and in a position which has been accurately determined on the spontaneous potential curve shown in Fig. 2. At this point it is brought to rest and the switch 21 is closed, thereby firing the marking means 15 from the gun 10 into the wall of the bore hole 13 where it is embedded in the position shown in dotted lines. When this has been done, the position of the marking means 15 is marked on the spontaneous potential curve shown in Fig. 2, as shown at C.

This operation may be continued until each of the petroleum bearing strata has been identified by a marking means 15, whereupon a metallic casing 26 may be inserted in the bore hole, as shown in Fig. 3.

When it is desired to perforate the casing 26 at the level of the petroleum bearing stratum A—B, for example, this may be accomplished by lowering into the bore hole 13 a gun perforator 27 of any known type as, for example, the perforator disclosed in prior patent No. 2,141,827, together with means 28 for detecting the marking means 15 embedded in the wall of the bore hole 13. The gun perforator 27 and the detecting means 28 are supported a known distance apart in the bore hole 13 upon a single cable 29 by means of which they may be raised and lowered together therein.

The firing circuit of the gun perforator 27 may be connected to one of the conductors 30 of the cable 29 and through a switch 31 at the surface of the earth to one terminal of a source of current 32, the other terminal of which is grounded at a point 33. As is known, projectiles for perforating the casing 26 may be fired from the gun perforator 27 by closing the switch 31.

The character of the detecting means 28 will depend on the type of marking means 15 used. If the latter provides a magnetic field, the detecting means will be designed to be responsive to this field. Likewise, if the marking means 15 gives off radioactive emissions or heat, respectively, the detecting means 28 will be designed to be responsive to such emissions or heat, respectively.

The response of the detecting means 28 may be transmitted through the conductors 34 and 35 in the cable 29 to the terminals 36 and 37, respectively, of a conventional type amplifier 39, the output of which may be indicated by means of suitable indicating means 40 located at the surface of the earth.

In order to position the gun perforator 27 at the exact level of the stratum A—B, it is moved through the bore hole 13 with the detecting means 28 until the latter reaches the level of the marking means 15, as indicated by the indicating means 40 at the surface of the earth. At this instant, the detecting means 28 is at the position C on the spontaneous potential curve shown in Fig. 2. Since the distance between the detecting means 28 and the gun perforator 27 is known, the corresponding distance may be marked off on the spontaneous potential curve shown in Fig. 2 and the actual position of the gun perforator 27 indicated thereon by a line designated by the letter D.

It is then a relatively simple matter to determine the distance between the point D on the curve and the stratum A—B, from which the distance of the gun perforator 27 below the stratum A—B may be readily computed. Knowing the latter distance, the gun perforator 27 may be moved upwardly this distance until it is exactly at the level of the stratum A—B. The switch 31 may then be closed and one or more projectiles fired from the gun perforator 27 through the bore hole casing 26, thereby permitting the petroleum to be obtained from the stratum A—B.

Fig. 4 illustrates apparatus in which a magnetic type detecting means is used. This modification may be employed when the marking means 15 comprises a magnetized projectile preferably made of a material which is not substantially demagnetized by a sudden shock, such as cobalt steel, for example. A projectile of this type provides a magnetic field which may be readily detected through a metallic bore hole casing.

The detecting means comprises a body 41 adapted to be lowered into a bore hole, within which is disposed a rotatable pickup winding 42, preferably provided with a core 42' of material having a high magnetic permeability and mounted on a shaft 43. The shaft 43 is adapted to be rotated about an axis parallel to the axis of the bore hole by an electric motor 44.

The motor 44 is energized from a source of electrical energy 45 located at the surface of the earth, one terminal of which is grounded at the point 46 and the other terminal of which is connected to a conductor 47 in the cable 29. The conductor 47 is connected to one terminal of the motor 44, the other terminal of which is connected to the casing 41 at the point 48, the circuit being completed through the liquid in the bore hole and the intervening earth.

The ends of the pickup coil 42 are connected to slip rings 49 and 50, respectively, which are connected through the conductors 51 and 52, respectively, in the cable 29 to the amplifier 39 at the surface of the earth, the output of which is fed to the recording type indicating instrument 40.

If difficulty is experienced with any residual magnetism in the bore hole casing 26, it may be desirable to provide a demagnetizing electromagnet 53 within the casing 41. One terminal of the magnet 53 may be connected to the conductor 47 and its other terminal may be connected to the casing 41 at the point 54, so that it may be energized from the source 45 at the surface of the earth. Where the electromagnet 53 is used, the source of electrical energy 45 should be a source of alternating current.

If desired, the marking means may be designed to give off radio active emissions as shown in Fig. 5. Referring to Fig. 5, the marking means comprises a hollow projectile 55 containing a quantity of radioactive material 56, such as carnotite or uraninite, for example, which may be inserted therein through a threaded opening 57 formed in the rear face thereof, which may be closed by a threaded plug 58.

As is known, radioactive materials of this nature give off radioactive emissions, such as gamma rays, for example, which may be quite readily detected through the metallic casing 26 by any suitable means designed for this purpose. In this modification, the detecting means 28 of Fig. 3 should be an apparatus responsive to radio-active emissions, such as for example, a Geiger counter or ionization chamber of known type. In all other particulars, the manner of operation is essentially as described above in connection with Fig. 3.

Fig. 6 illustrates a marking means which is adapted to generate heat over a long period of time after being embedded in the wall of a bore hole. In this modification, the marking means comprises a hollow projectile 59 containing a quantity of material 60 capable of generating heat when in contact with water, such as sodium, for example. The material 60 may be inserted in the projectile 59 through an aperture 61 formed in the rear face thereof, which may be closed by a threaded plug 62.

At the forward end of the projectile 59 is provided a tapered aperture 63 within which a correspondingly tapered plug 64 is adapted to be tightly fitted. The tapered plug 64 is preferably made of a soft material such as aluminum, for example, and it is provided with a forward portion 65 of reduced cross-section which terminates in a laterally extending member 66.

In operation, when the projectile 59 is fired from the gun 10 into the wall of the bore hole 13 as described above in connection with Fig. 1, the impact of the member 66 against the wall of the bore hole 13 forces the plug 64 through the aperture 63 until the member 66 is brought to rest on the front face of the projectile 59, as shown in dotted lines. Inasmuch as the reduced forward portion 65 of the plug 64 fits loosely in the aperture 63, water from the formation in which it is embedded will seep therethrough into the projectile 59.

The reaction of the water on the sodium within the projectile 59 generates heat which is accompanied by the production of hydrogen gas. As the hydrogen continues to form, the pressure inside the projectile 59 will increase until it is sufficient to prevent any further seepage of water through the aperture 63. This will permit the hydrogen to escape from the projectile 59 until the pressure is reduced sufficiently to permit water to seep in once again, whereupon the reaction will be repeated.

It will be apparent that heat will be generated in this fashion over a long period of time at the particular level in which the projectile 59 is embedded in the wall of the bore hole 13.

The heat generated by the chemical reaction within the projectile 59 produces a rise in temperature in the adjacent wall of the bore hole 13 and in the adjacent portion of the bore hole casing 26 which may be readily detected by lowering any suitable temperature responsive means in the bore hole. In this case, the detecting means 28 shown in Fig. 3 may be any conventional type thermometer and the operation will be exactly as described above in connection with this figure.

If necessary, a plurality of projectiles 59 may be fired into the wall of the bore hole 13 in close proximity to each other, or at the same level in different directions, to cause a greater production of heat and a corresponding increase in temperature at this level.

Instead of sodium, other materials capable of generating heat upon contact with water may be used. For example, sodium peroxide will react with water to produce oxygen with the generation of heat. In this connection if any oil is present, the oxygen released may cause a slight combustion thereof, generating an additional quantity of heat. Similarly, calcium carbide, when in contact with water, gives off acetylene gas, and the reaction is accompanied by the generation of heat.

Although only one gun has been shown in the modification of Fig. 1, obviously a plurality of guns may be used for locating a plurality of marking members in the wall of the bore hole. This may be accomplished by utilizing a gun of the type described in the above mentioned prior Patent No. 2,141,827.

Furthermore, instead of utilizing the spontaneous potential curve shown in Fig. 2 for locating the marking means in the bore hole, a curve of the apparent resistivity of the formations surrounding the bore hole obtained by utilizing either one electrode or three electrodes, as disclosed in prior Patent No. 1,819,923 to Conrad Schlumberger may be used. As a matter of fact, any curve indicative of a physical property of the formations traversed by a bore hole, whether it be magnetic, electric, optic, acoustic, or otherwise, may be used. In any case, the method of locating the marking member in the wall of the bore hole will be the same as described above.

Instead of making a separate curve of a characteristic of the formations surrounding the bore hole, and subsequently locating the marking means in the bore hole, both these operations may be performed simultaneously, by utilizing apparatus similar to that shown in Fig. 1. In this case, whenever an interesting stratum is located by the investigating means, marking means may be projected into the wall of the bore hole in the vicinity of the stratum and at a depth which is accurately known with respect to the curve of the characteristic being investigated.

While several specific embodiments of the invention have been described above, the latter is not intended to be in any way limited thereby, but is susceptible of numerous changes in form and detail within the scope of the appended claims.

I claim:

1. Apparatus for identifying predetermined levels in a bore hole comprising geophysical investigating means adapted to be lowered into the bore hole for obtaining indications of a characteristic of the surrounding formations, a gun located a predetermined distance from said investigating means and movable therewith, well casing penetrating emanation producing marking means adapted to be projected from the gun into the wall of the bore hole and means for firing the gun to project the marking means into the wall of the bore hole.

2. Apparatus for identifying predetermined levels in a bore hole, comprising an electrode adapted to be lowered into the bore hole, a gun located a predetermined distance from said electrode and movable therewith, well casing penetrating emanation producing marking means in the gun and adapted to be projected from said gun into the wall of the bore hole, means including said electrode for obtaining indications of an electrical characteristic of the formations surrounding the bore hole, and means for firing the gun to project the marking means into the wall of the bore hole.

3. Marking means for identifying a predetermined level in a bore hole, comprising a hollow body having an opening at the forward end thereof and containing a quantity of material which generates heat upon contact with water, and closure means for said opening, said closure means being adapted to be rendered ineffective when the body is projected into the wall of the bore hole, thereby permitting water to reach the heat generating material.

4. A method of positioning a body at a predetermined level in a bore hole after a casing has been inserted therein, comprising identifying said level prior to the insertion of the casing in the bore hole by placing well casing penetrating emanation producing marking means in the wall of the bore hole at a known and arbitrarily selected position with respect to said level, disposing the body along with means for detecting said marking means in the bore hole after the casing has been inserted therein, moving both said body and detecting means through the bore hole, obtaining indications of the response of said detecting means to determine the instant it reaches the level of the marking means, and from that instant moving said body and detecting means toward said level through a distance equal to the distance between said marking means and level.

5. A method of accurately positioning a member within a well with relation to a part of the well spaced at such distance from the top of the well that accuracy of measurements from the top of the well cannot be relied upon, comprising: establishing a marker by placing marking means in proximity to and at a known and arbitrarily selected distance from the position desired for said member; moving said member into the well and locating the same in said desired position, by placing said member at said known distance from said marker independently of the computed distance of said desired position from the top of the well.

6. A method of accurately positioning a member within a well with relation to a part of the well spaced at such distance from the top of the well that accuracy of measurements from the top of the well cannot be relied upon, comprising: establishing a marker by placing marking means in proximity to and at a known arbitrarily selected distance from the position desired for said member; moving a marker locating means into the well to a known position relative to said marker; and then by using said known position of said marker locating means as a guide, placing said member at said known distance from said marker.

7. A method of accurately positioning a member within a well with relation to a part of the well spaced at such distance from the top of the well that accuracy of measurements from the top of the well cannot be relied upon, comprising: establishing a radio active marker by placing radioactive marking means in proximity to and at a known and arbitrarily selected distance from the position desired for said member; moving a marker locating means which is responsive to radiations into the well to a known position relative to said marker; and then by using said known position of said marker locating means as a guide, placing said member at said known distance from said marker.

8. A method of accurately positioning a member within a well with relation to a part of the well spaced at such distance from the top of the well that accuracy of measurements from the top of the well cannot be relied upon, comprising: establishing a marker by placing marker means of magnetic material in proximity to and at a known and arbitrarily selected distance from the position desired for said member; moving a marker locating means which is responsive to said magnetic material into the well to a known position relative to said marker; and then by using said known position of said marker locating means as a guide, placing said member at said known distance from said marker.

9. In means for exploring a well, the combination of: geophysical exploring means to indicate changes in and characteristics of strata in the earth; means for depositing a marker below the surface of the ground; marker means carried by said marker depositing means and means for moving the aforesaid geophysical exploring means and depositing means in correlation in the well.

10. In means for exploring a well, the combination of: geophysical exploring means to indicate changes in the characteristics of strata in the earth; a gun of a size to move in said well; a radio active projectile carried by said gun; means for firing said projectile from said gun at a desired time; and means for moving said geophysical exploring means and said gun in correlation in said well.

11. A method of producing a fluid from the earth wherein a well intersects a production stratum, a marker is established by placing marking means in a known and arbitrarily selected relation to said production stratum independently of the location of said production stratum relative to the top of the well, and a fluid entry means is moved into the well and located in a position correlated with said marker in accordance with the known relation of said marker and said production stratum, whereby said fluid entry means will coincide with said production stratum.

12. A method of producing fluid from the earth wherein a well intersects a production stratum, comprising: establishing a marker by placing marking means in proximity to and at a known and arbitrarily selected distance from said production stratum independently of the computed distance of said production stratum from the top of the well; moving a fluid entry means into the well and locating the same in a position coinciding with said production stratum, said locating step being acomplished by placing said fluid entry means at said known distance from said marker independently of the computed distance of said production stratum from the top of the well.

13. A method of producing fluids from the earth, comprising: forming a bore hole in the earth so that the same will intersect a plurality of production strata; placing a marker in proximity to each of said strata at arbitrarily selected locations with respect thereto; setting a casing in the bore hole; locating said markers; and using said markers as guides, perforating said casing at selected production stata.

14. A method of placing a reference marker in the earth surrounding a bore hole, comprising the steps of lowering into the bore hole at least one well casing penetrating emanation producing marker means together with apparatus for depositing said marker means in the earth surrounding the bore hole, and causing said depositing apparatus, when at an arbitrarily selected depth in the hole, to deposit the marker means in the earth surrounding the bore hole, whereby the location of the marker means can be readily determined subsequently through a well casing by the emanation produced thereby.

15. A method of placing a reference marker in the earth surrounding a bore hole, comprising the steps of lowering into the bore hole at least one radioactive projectile together with gun mechanism for firing said projectile, and causing said gun mechanism, when at an arbitrarily selected depth in the hole, to fire the projectile into the earth surrounding the bore hole, whereby the location of the projectile can be readily determined subsequently through a well casing by the detectable radioactivity emitted therefrom.

16. In bore hole operations, the steps of lowering into the bore hole at least one well casing penetrating emanation producing projectile together with gun mechanism for firing said projectile, causing said gun mechanism, when at an arbitrarily selected depth in the hole, to fire the projectile into the earth surrounding the bore hole, thus establishing a reference marker in the bore hole, withdrawing said gun mechanism from the hole, casing the hole, subsequently lowering into the hole a detector responsive to the emanation produced by said projectile, and determining the location of said projectile reference marker through the casing by means of said detector.

17. A method of positioning a body in a bore hole, comprising the steps of lowering into the bore hole at least one well casing penerating emanation producing projectile together with gun mechanism for firing said projectile, causing said gun mechanism, when at an arbitrarily selected depth in the hole, to fire the projectile into the earth surrounding the bore hole, thus establishing a reference marker in the bore hole, withdrawing said gun mechanism from the hole, casing the hole, subsequently lowering into the hole a body to be positioned together with a detector responsive to the emanation produced by said projectile, determining the location of said projectile reference marker through the casing by means of said detector, and positioning said body in the bore hole with respect to said projectile reference marker.

18. A method of placing a reference marker in known relation to a formation traversed by a bore hole, comprising the steps of lowering into the bore hole at least one well casing penetrating emanation producing marker means together with apparatus for depositing the marker means in the earth surrounding the bore hole, simultaneously lowering therewith geophysical exploring means in known relation to said depositing apparatus, obtaining, by said exploring means, identifying indications of a characteristic of the formations surrounding the bore hole, and causing said apparatus to deposit the marker means in the earth surrounding the bore hole and in known arbitrarily selected relation to an identified one of said formations, whereby the location of the marker means can be readily determined subsequently through a well casing by the emanation produced thereby.

19. A method of placing a reference marker in known relation to a formation traversed by a bore hole, comprising the steps of lowering into the bore hole at least one radioactive marker member together with apparatus for depositing said marker member in the earth surrounding the bore hole, simultaneously lowering therewith geophysical exploring means in known relation to said depositing apparatus, obtaining, by said exploring means, identifying indications of a characteristic of the formations surrounding the bore hole, and causing said apparatus to deposit the marker member in the earth surrounding the bore hole and in known, arbitrarily selected relation to an identified one of said formations.

20. A method of placing a reference marker in known relation to a formation traversed by a bore hole, comprising the steps of lowering into the bore hole at least one magnetized marker member together with apparatus for depositing said marker member in the earth surrounding the bore hole, simultaneously lowering therewith geophysical exploring means in known relation to said depositing apparatus, obtaining, by said exploring means, identifying indications of a characteristic of the formations surrounding the bore hole, and causing said apparatus to deposit the marker member in the earth surrounding the bore hole and in known, arbitrarily selected relation to an identified one of said formations.

21. A method of placing a reference marker in known relation to a formation traversed by a bore hole, comprising the steps of lowering into the bore hole at least one heat-generating marker member together with apparatus for depositing said marker member in the earth surrounding the bore hole, simultaneously lowering therewith geophysical exploring means in known relation to said depositing apparatus, obtaining, by said exploring means, identifying indications of a characteristic of the formations surrounding the bore hole, and causing said apparatus to deposit the marker member in the earth surrounding the bore hole and in known, arbitrarily selected relation to an identified one of said formations.

22. A method of placing a reference marker in known relation to a formation traversed by a bore hole, comprising the steps of lowering into the bore hole at least one radioactive projectile together with gun mechanism for discharging said projectile into the earth surrounding the bore hole, simultaneously lowering an exploring electrode therewith in known relation to said gun mechanism, obtaining indications of spontaneous potentials occurring between said electrode and a point of reference, said potentials being characteristic of the formations surrounding the bore hole, and causing said gun mechanism to discharge the projectile into the earth surrounding the bore hole and in known, arbitrarily selected relation to one of said formations.

23. In a method for bringing an oil well into production, the steps of lowering into the bore hole at least one radioactive projectile together with gun mechanism for discharging said projectile into the earth surrounding the bore hole, simultaneously lowering an exploring electrode therewith in known relation to said gun mechanism, obtaining indications of spontaneous potentials occurring between said electrode and a point of reference, said potentials being characteristic of the formations surrounding the bore hole, causing said gun mechanism to discharge the projectile into the earth surrounding the bore hole and in known, arbitrarily selected relation to one of said formations, thereby establishing a detectable reference marker in the bore hole, withdrawing said gun mechanism, inserting a casing in the bore hole, lowering into the casing perforating apparatus together with a detector responsive to the radioactivity associated with said projectile, determining the location of said projectile reference marker by means of said detector, bringing said perforating apparatus to the level of said one formation by using said projectile reference marker as a point of reference, and causing said perforating apparatus to perforate the casing at said one formation.

HENRI-GEORGES DOLL.

REFERENCES CITED

The following references are of record in the file of this patent:

UNITED STATES PATENTS

| Number | Name | Date |
| --- | --- | --- |
| 1,928,970 | Johnston | Oct. 3, 1933 |
| 2,029,490 | Lane | Feb. 4, 1936 |
| 2,033,562 | Wells | Mar. 10, 1936 |
| 2,037,306 | Blau | Apr. 14, 1936 |
| 2,167,630 | Bazzoni | Aug. 1, 1939 |
| 2,171,840 | Armentrout | Sept. 5, 1939 |
| 2,220,205 | Buckley | Nov. 5, 1940 |